(12) United States Patent
Miyamoto

(10) Patent No.: US 8,713,902 B2
(45) Date of Patent: May 6, 2014

(54) BAG-MAKING AND PACKAGING MACHINE

(75) Inventor: Hideshi Miyamoto, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 665 days.

(21) Appl. No.: 12/594,470

(22) PCT Filed: Apr. 9, 2008

(86) PCT No.: PCT/JP2008/057026
§ 371 (c)(1),
(2), (4) Date: Oct. 2, 2009

(87) PCT Pub. No.: WO2008/136246
PCT Pub. Date: Nov. 13, 2008

(65) Prior Publication Data
US 2010/0115894 A1 May 13, 2010

(30) Foreign Application Priority Data

Apr. 26, 2007 (JP) ................................ 2007-116408
Apr. 26, 2007 (JP) ................................ 2007-116409

(51) Int. Cl.
*B65B 9/20* (2012.01)
*B65B 51/12* (2006.01)
*B65B 51/18* (2006.01)

(52) U.S. Cl.
CPC .............. *B65B 9/2028* (2013.01); *B65B 9/20* (2013.01); *B65B 9/2021* (2013.01); *B65B 51/12* (2013.01); *B65B 51/18* (2013.01)
USPC .......................... 53/551; 53/375.9; 493/302

(58) Field of Classification Search
CPC ...... B65B 9/20; B65B 9/2028; B65B 9/2021; B65B 51/12; B65B 51/18; B65B 2009/06
USPC ........ 53/450, 451, 548, 550, 551, 552, 375.8, 53/375.9, 376.2; 493/302
See application file for complete search history.

(56) References Cited

U.S. PATENT DOCUMENTS 2,200,971 A * 5/1940 Sonneborn et al. ............. 53/451
2,899,875 A * 8/1959 Leasure .......................... 53/551
(Continued)

FOREIGN PATENT DOCUMENTS

DE      1178348 B      9/1964
EP      0903292 A1     3/1999
(Continued)

OTHER PUBLICATIONS

Extended European Search Report of the corresponding European Application No. 08740129.5, dated Dec. 16, 2013. 7 pages.

*Primary Examiner* — Stephen F Gerrity
(74) *Attorney, Agent, or Firm* — Global IP Counselors, LLP

(57) ABSTRACT

A bag-making and packaging machine includes a forming mechanism, a vertical sealing mechanism, a transverse sealing mechanism and a receiving member. The forming mechanism is configured to roll a sheet-shaped packaging material into a cylindrical shape to form a cylindrical packaging material. The vertical sealing mechanism is configured and arranged to seal an overlapping portion of the cylindrical packaging material with heat vertically along a direction in which the cylindrical packaging material extends. The receiving member is attached to the forming mechanism in a position facing the vertical sealing mechanism, and configured and arranged to sandwich the overlapping portion together with the vertical sealing mechanism. The receiving member has elasticity with which the receiving member presses the overlapping portion toward the vertical sealing mechanism.

3 Claims, 12 Drawing Sheets

(56) References Cited

U.S. PATENT DOCUMENTS

| | | | |
|---|---|---|---|
| 2,923,115 A * | 2/1960 | Frank et al. | 53/551 |
| 2,982,334 A * | 5/1961 | Cooper et al. | 53/551 |
| 3,056,339 A | 10/1962 | Sommerfeld et al. | |
| 3,381,442 A * | 5/1968 | Paxton | 53/551 |
| 3,729,359 A * | 4/1973 | Monsees | 53/550 |
| 3,935,048 A * | 1/1976 | Rucker | 156/203 |
| 4,043,098 A * | 8/1977 | Putnam, Jr. et al. | 53/551 |
| 4,136,505 A * | 1/1979 | Putnam, Jr. et al. | 53/551 |
| 4,144,693 A * | 3/1979 | Ogata | 53/552 |
| 4,322,929 A * | 4/1982 | Neumann | 53/551 |
| 4,711,068 A * | 12/1987 | Dominguez | 53/551 |
| 4,950,345 A * | 8/1990 | Kreager et al. | 156/203 |
| 5,085,036 A * | 2/1992 | Evans et al. | 53/550 |
| 5,125,217 A * | 6/1992 | Fukuda | 53/551 |
| 6,237,308 B1 * | 5/2001 | Quintin et al. | 53/551 |
| 6,588,177 B1 * | 7/2003 | Melchoir | 53/551 |
| 6,599,389 B1 * | 7/2003 | Uneda | 156/379.8 |
| 6,612,356 B2 * | 9/2003 | Kong et al. | 156/461 |
| 2004/0040261 A1 * | 3/2004 | Troyer et al. | 53/551 |
| 2010/0043352 A1 * | 2/2010 | Hashimoto et al. | 53/375.9 |

FOREIGN PATENT DOCUMENTS

| | | | |
|---|---|---|---|
| JP | 05004608 A * | 1/1993 | B65B 9/20 |
| JP | H5-42905 A | 2/1993 | |
| JP | 2000-72104 | 3/2000 | |
| JP | 2000-326907 A | 11/2000 | |
| JP | 2004-123215 A | 4/2004 | |
| JP | 2006-1552 A | 1/2006 | |

* cited by examiner

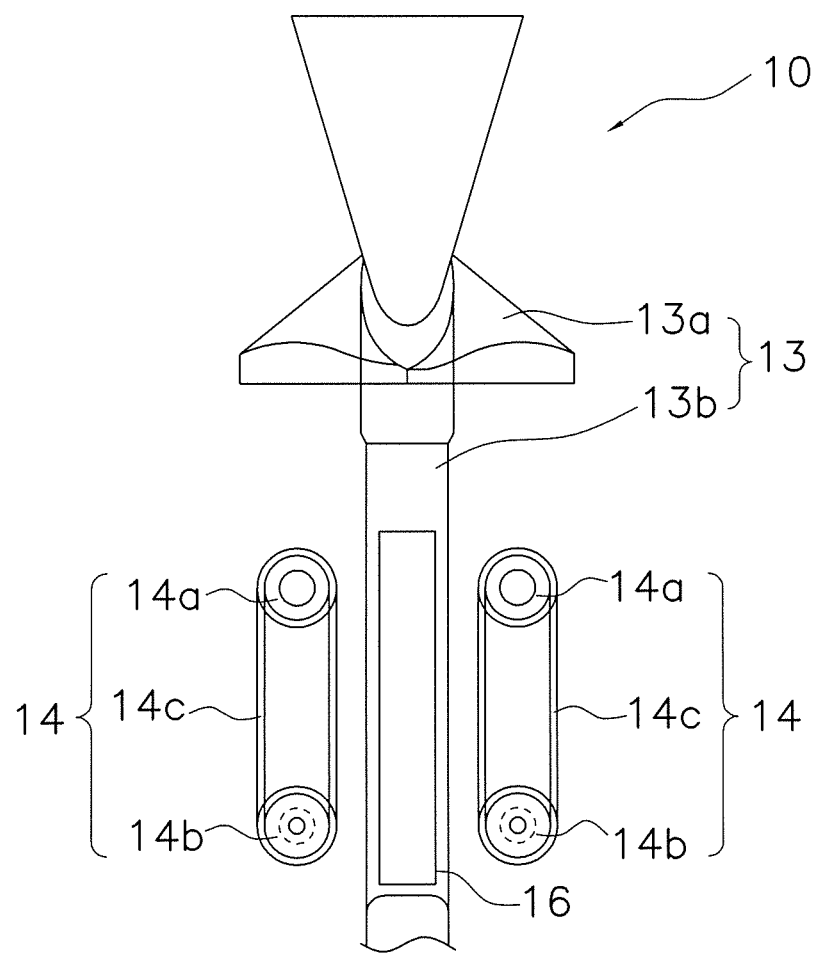
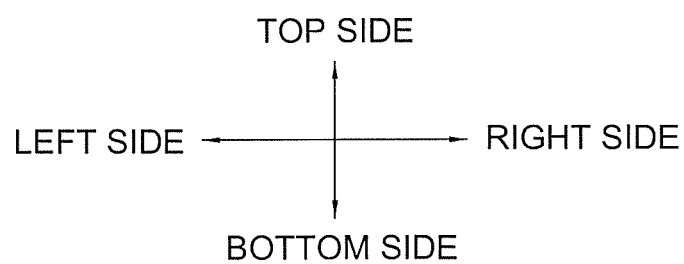
FIG. 3

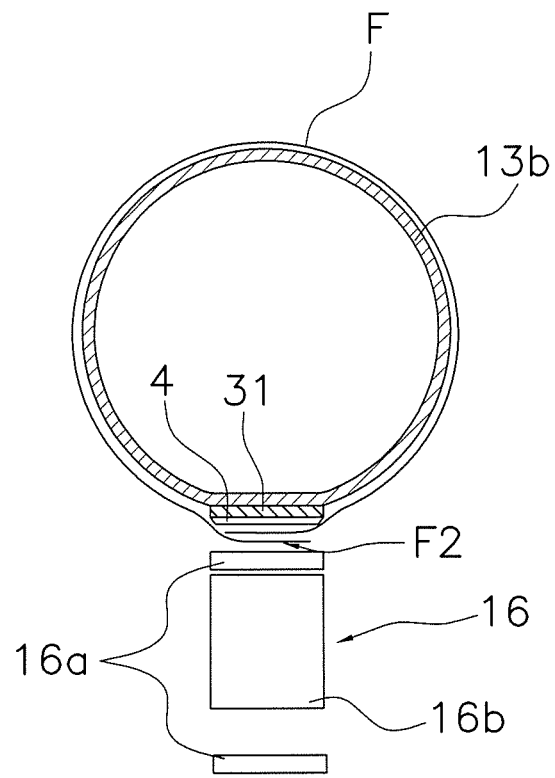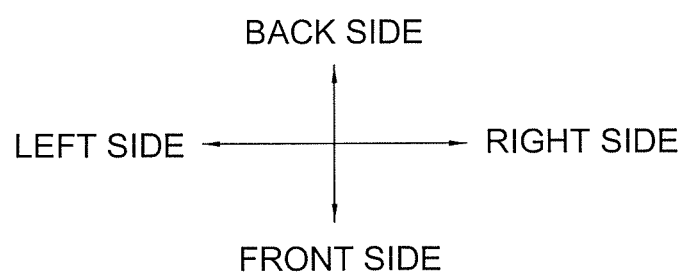
F I G. 5

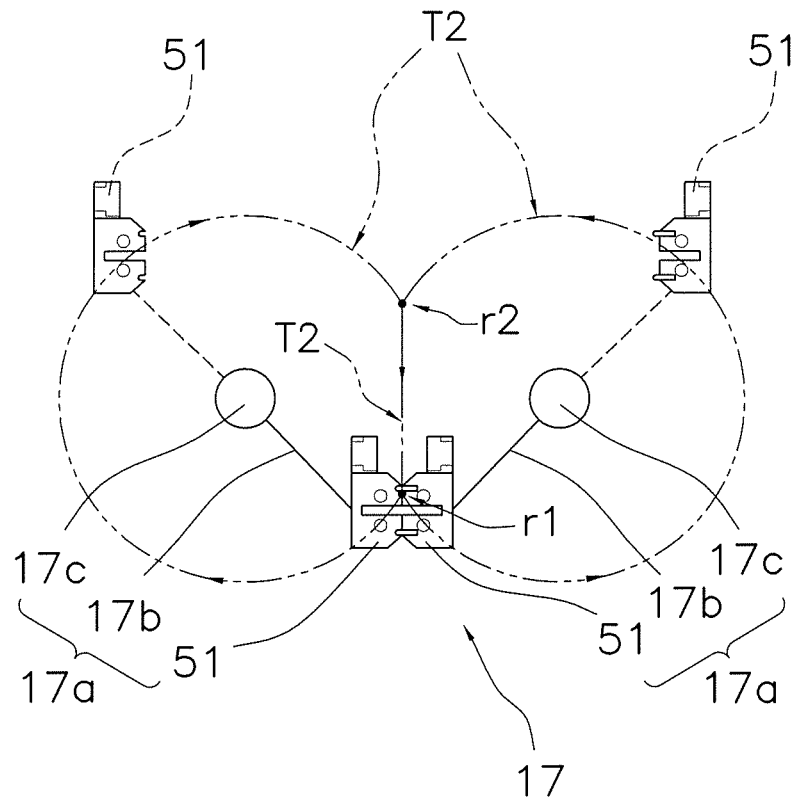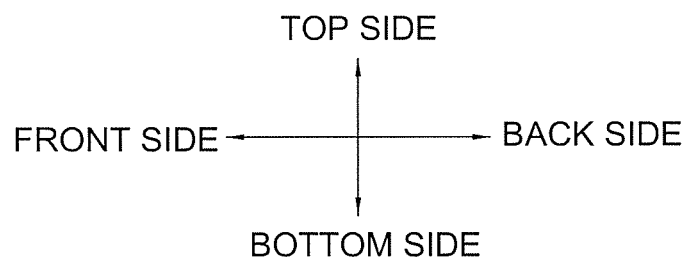
F I G. 6

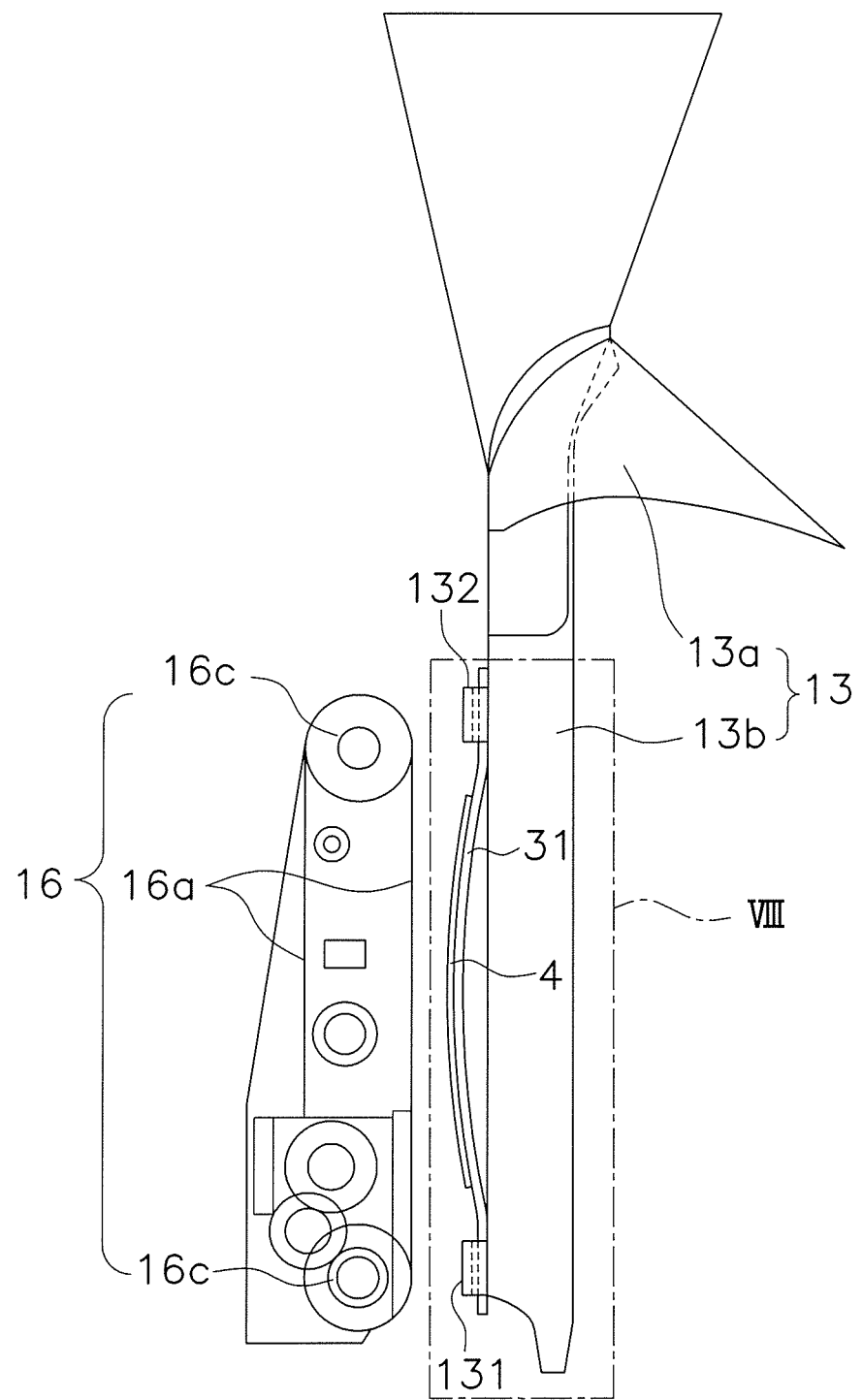
F I G. 7

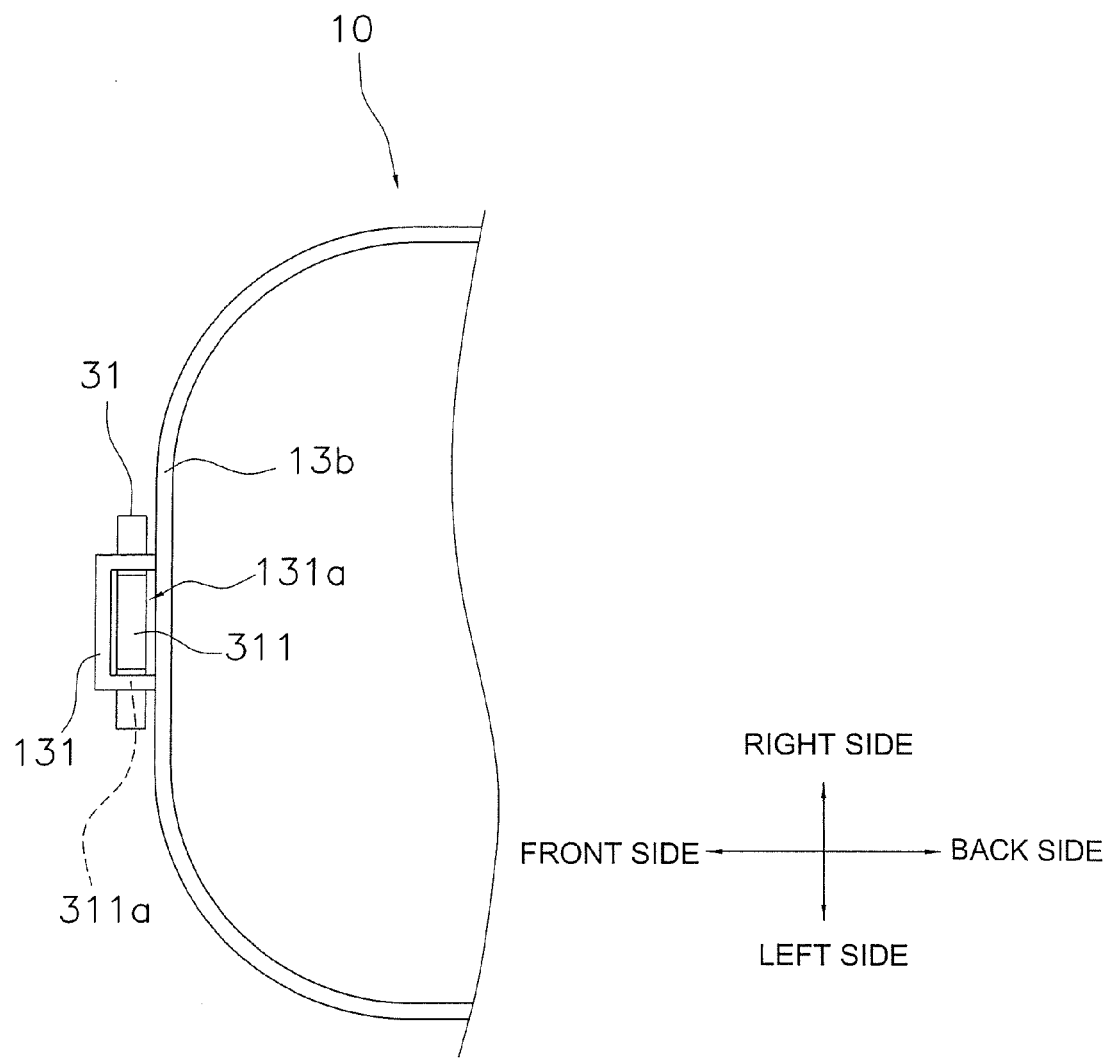
F I G. 1 1

BAG-MAKING AND PACKAGING MACHINE

CROSS-REFERENCE TO RELATED APPLICATIONS

This national phase application claims priority to Japanese Patent Application Nos. 2007-116408 and 2007-116409 both filed on Apr. 26, 2007. The entire disclosures of Japanese Patent Application Nos. 2007-116408 and 2007-116409 are hereby incorporated herein by reference.

TECHNICAL FIELD

The present invention relates to a bag-making and packaging machine and particularly relates to sealing a packaging material.

BACKGROUND ART

Conventionally, technologies that pack a predetermined amount of contents such as confectionery into bags have been proposed. Specifically, an overlapping portion of a packaging material that has been rolled into a cylindrical shape is vertically sealed. Then, a predetermined amount of the contents is put into the packaging material, and thereafter the packaging material is transversely sealed and closed. The closed portion is cut by a cutter or the like.

Such technologies are, for example, disclosed in U.S. Pat. No. 4,950,345 and JP-A No. 2006-1552. In relation to vertically sealing the overlapping portion of the packaging material, in U.S. Pat. No. 4,950,345, the overlapping portion of the packaging material is sandwiched between and sealed by a heat sealing die and a back-up pad. In JP-A No. 2006-1552, the overlapping portion of the packaging material is sandwiched between and sealed by a rotating belt and a receiving member.

Incidentally, in U.S. Pat. No. 4,950,345, the back-up pad is disposed across the entirety of a position facing the heat sealing die. However, in this aspect, force acting on the packaging material when sealing the packaging material ends up dispersing. When force disperses, force necessary for sealing becomes insufficient and it becomes easier for poor sealing to arise.

Thus, in JP-A No. 2006-1552, in order to prevent dispersal of force acting on the packaging material, the receiving member is plurally divided and disposed.

DISCLOSURE OF THE INVENTION

However, even in the technology of JP-A No. 2006-1552, force acting on the packaging material may disperse to each of the plural receiving members such that force necessary for sealing will become insufficient.

The present invention has been made in light of the aforementioned circumstances, and it is an object thereof to reduce poor sealing of an overlapping portion of a packaging material that has been rolled into a cylindrical shape.

A bag-making and packaging machine according to a first aspect of the present invention packages contents while making bags from a sheet-shaped packaging material. The bag-making and packaging machine includes a foaming mechanism, a vertical sealing mechanism, a transverse sealing mechanism and a receiving member. The forming mechanism is configured and arranged to roll the sheet-shaped packaging material into a cylindrical shape to form a cylindrical packaging material. The vertical sealing mechanism is configured and arranged to seal an overlapping portion of the cylindrical packaging material with heat vertically along a direction in which the cylindrical packaging material extends. The transverse sealing mechanism is configured and arranged to seal the cylindrical packaging material with heat in a transverse direction of the cylindrical packaging material. The receiving member is attached to the forming mechanism in a position facing the vertical sealing mechanism, and configured and arranged to sandwich the overlapping portion together with the vertical sealing mechanism. The receiving member has elasticity, with which the receiving member presses the overlapping portion toward the vertical sealing mechanism.

According to this bag-making and packaging machine, the receiving member has elasticity and presses, with this elasticity, the overlapping portion toward the vertical sealing mechanism, so force necessary for sealing can be applied to the overlapping portion, and therefore poor sealing can be reduced.

Preferably, the receiving member is made of metal; for example, spring steel can be employed. Thus, the strength of the receiving member can be raised, and therefore the elasticity of the receiving member can be maintained.

From the standpoint of imparting elasticity to the receiving member, preferably the receiving member has a shape that curves toward the vertical sealing mechanism.

More preferably, the receiving member is detachably attached to the forming mechanism. Thus, the receiving member can be removed when cleaning the forming mechanism, and therefore damage to the receiving member caused by such cleaning can be prevented.

From the standpoint of preventing damage to the receiving member, preferably a buffer material is disposed on a surface of the receiving member on a side facing the vertical sealing mechanism. The buffer material contacts the overlapping portion of the packaging material. Thus, shock to the packaging material resulting from pressing the packaging material toward the vertical sealing mechanism can be absorbed by the buffer material. Thus, the packaging material that has been sandwiched between the vertical sealing mechanism and the receiving mechanism can be prevented from being damaged.

It is preferable to employ a material that has elasticity and/or a material that has heat resistance for the buffer material. With the buffer material that has elasticity, the packaging material can be prevented from being damaged. With the buffer material that has heat resistance, the buffer material can be prevented from being damaged by the heat of the vertical sealing mechanism.

A material where friction of its surface on the vertical sealing mechanism side is smaller than a prescribed friction level may also be employed for the buffer material. This buffer material virtually does not hinder the conveyance of the packaging material. The prescribed friction level is set so that, when the packaging material is sandwiched between the vertical sealing mechanism and the receiving member, friction that arises between the buffer material and the packaging material during conveyance of the packaging material virtually does not hinder the conveyance of the packaging material.

Further, it is preferable for the bag-making and packaging machine to further include a first support portion that supports the receiving member on a downstream side in a conveyance direction of the packaging material and deters the receiving member from shifting in the conveyance direction. According to this bag-making and packaging machine, even when force toward the downstream side arises in the receiving member because of friction arising between the packaging material and the receiving member during conveyance of the packaging material, the receiving member does not shift toward the downstream side. The vertical sealing mechanism includes an annular belt member that rotates at a speed on the basis of a conveyance speed of the packaging material, and even when force toward the downstream side arises in the receiving member because of this belt, the receiving member does not shift toward the downstream side.

Further, it is preferable for the bag-making and packaging machine equipped with the first support portion to further include a second support portion. The second support portion supports the receiving member on the downstream side and deters the receiving member from shifting from a position corresponding to the overlapping portion.

Further, it is preferable for the bag-making and packaging machine equipped with the first support portion to further include a third support portion. The third support portion supports the receiving member on an upstream side in the conveyance direction. Thus, the receiving member can be fixed to the forming mechanism.

According to the bag-making and packaging machine as described above, the receiving member has elasticity and presses, with this elasticity, the overlapping portion toward the vertical sealing mechanism, so force necessary for sealing can be applied to the overlapping portion, and therefore poor sealing can be reduced.

BRIEF DESCRIPTION OF THE DRAWINGS

FIG. 3 is a front view of the bag making section shown in FIG. 2 as seen from its front side.

FIG. 5 is a cross sectional view of the vertical sealing mechanism taken along a section line V-V shown in FIG. 4.

FIG. 6 is a schematic diagram showing a transverse sealing mechanism.

FIG. 7 is a side view showing the bag making section shown in FIG. 2 as seen from its right side.

FIG. 11 is a bottom view showing the bag making section as seen from its bottom side.

BEST MODE FOR CARRYING OUT THE INVENTION

Figure 1:
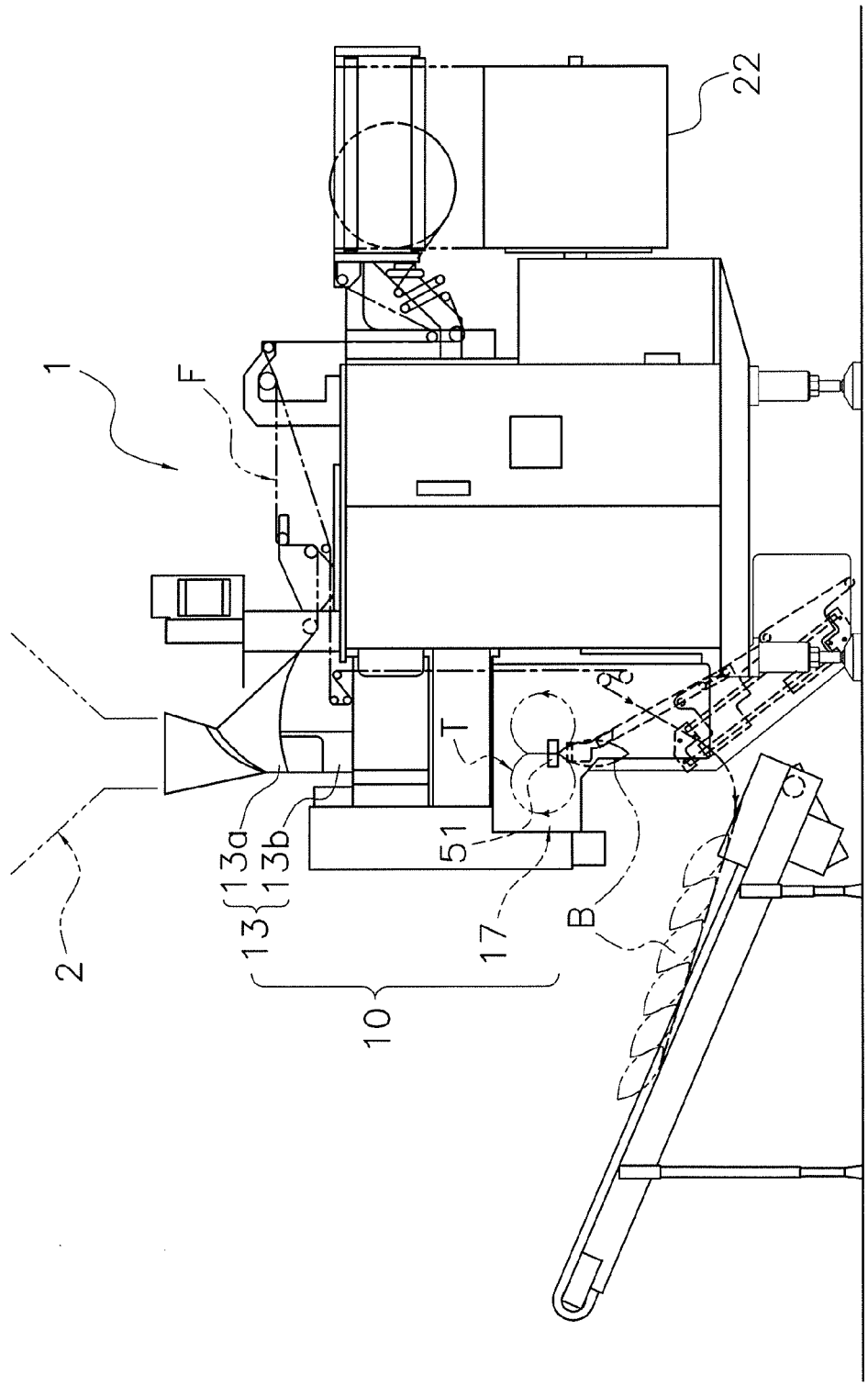
FIG. 1 is a simplified side view showing a bag-making and packaging machine pertaining to an embodiment of the present invention.

FIG. 1 is a diagram conceptually showing a bag-making and packaging machine 1 pertaining to an embodiment of the present invention. The bag-making and packaging machine 1 is equipped with a film roll holding section 22 and a bag making section 10. These components will be described later, but first an overview of the bag-making and packaging machine 1 will be described.

Overview of Bag-Making and Packaging Machine

The bag-making and packaging machine 1 packs a predetermined amount of contents C such as confectionery into bags using a packaging material. Specifically, bags B into which the contents C have been packed are formed by sealing, in a vertical direction and a transverse direction, a packaging material that has been rolled into a cylindrical shape.

It will be noted that a thermoplastic film F, for example, can be employed for the packaging material. Further, the amount of the contents C is measured by a meter 2 disposed separately from the bag-making and packaging machine 1, and a predetermined amount of the contents C is delivered to the bag-making and packaging machine 1. The meter 2 may also, for example, be disposed in the bag-making and packaging machine.

Film Roll Holding Section

The film roll holding section 22 includes a film roll and a sensor. Sheet-shaped film F is wrapped around the film roll, and the film roll reels out the film F.

The film F that has been reeled out from the film roll travels over the top side of the bag-making and packaging machine 1 via dancer rollers and the like and is conveyed to the bag making section 10. The dancer rollers prevent the film F from becoming slack and meandering during conveyance by maintaining the tension in the film F in a predetermined range.

The sensor is installed in the vicinity of the film roll and detects the remaining amount of the film F wrapped around the film roll. Additionally, when the remaining amount becomes equal to or less than a predetermined amount, notification that the remaining amount is small is given by a buzzer or the lighting of a lamp.

Bag Making Section

Figure 2:
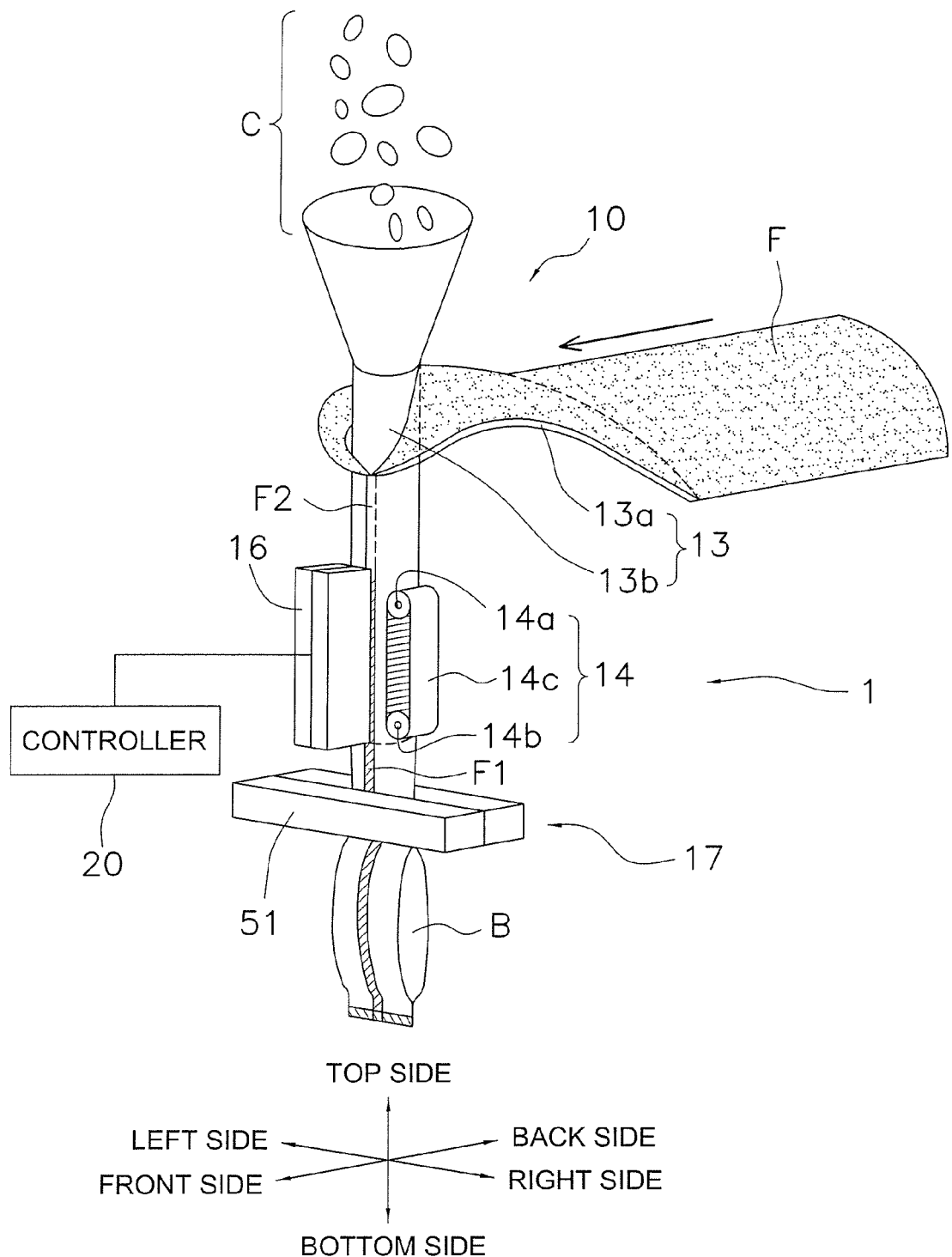
FIG. 2 is a perspective view schematically showing a bag making section.

FIG. 2 is a perspective diagram conceptually showing the bag making section 10. The bag making section 10 is equipped with a forming mechanism 13, a conveyance mechanism 14, a vertical sealing mechanism 16, a transverse sealing mechanism 17, a receiving member 31 and a buffer material 4. Below, these respective components will be specifically described. It will be noted that the receiving member 31 and the buffer material 4 are shown in later-described FIG. 5.

Forming Mechanism

The forming mechanism 13 includes a tube 13b and a former 13a and rolls, into a cylindrical shape, the film F that has been conveyed from the film roll holding section 22.

The tube 13b is a cylindrical member, and the top end and the bottom end of the tube 13b are both open. A predetermined amount of the contents C that has been measured by the meter 2 is put into the tube 13b from the top end of the tube 13b. The contents C that have been put into the tube 13b travel through the inside of the tube 13b and are discharged from the bottom end of the tube 13b and into the bags B before the bags B are closed.

The former 13a is disposed on the top end side of the tube 13b so as to surround the tube 13b.

Specifically, the portion of the former 13a on the back side with respect to the tube 13b has a shape where the collar of a sailor uniform is spread toward the back side. On the front side with respect to the tube 13b, the portion of the former 13a that surrounds the tube 13b from its right side and the portion of the former 13a that surrounds the tube 13b from its left side overlap each other.

The film F that has been conveyed from the back side with respect to the tube 13b slides on the surface of the top side of the former 13a and is fed between the former 13a and the tube 13b. Thus, the film F is rolled into a cylindrical shape such that the ends of the film F overlap each other on the front side of the tube 13b (overlapping portion F2).

It will be noted that the tube 13b and the former 13a can be replaced depending on the size of the bags B that are to be formed.

Conveyance Mechanism

The conveyance mechanism 14 includes a drive roller 14a, a driven roller 14b and a belt 14c (an annular belt member) and downwardly conveys the cylindrical film F that surrounds the tube 13b (FIG. 2). Specifically, the drive roller 14a is disposed on the top side and the driven roller 14b is disposed on the bottom side. The belt 14c is stretched around the drive roller 14a and the driven roller 14b.

The film F is sandwiched between the belt 14c and the tube 13b. Additionally, when the drive roller 14a rotates, the belt 14c also rotates. Thus, the film F contacting the belt 14c is conveyed downward. It will be noted that the drive roller 14a can be caused to rotate by a motor or the like, for example.

FIG. 3 is a diagram showing the bag making section 10 as seen from its front side. In FIG. 3, the conveyance mechanism 14 is disposed on both the left side and the right side with respect to the tube 13b. According to this aspect, it is easy to downwardly convey the cylindrical film F.

Vertical Sealing Mechanism

Figure 4:
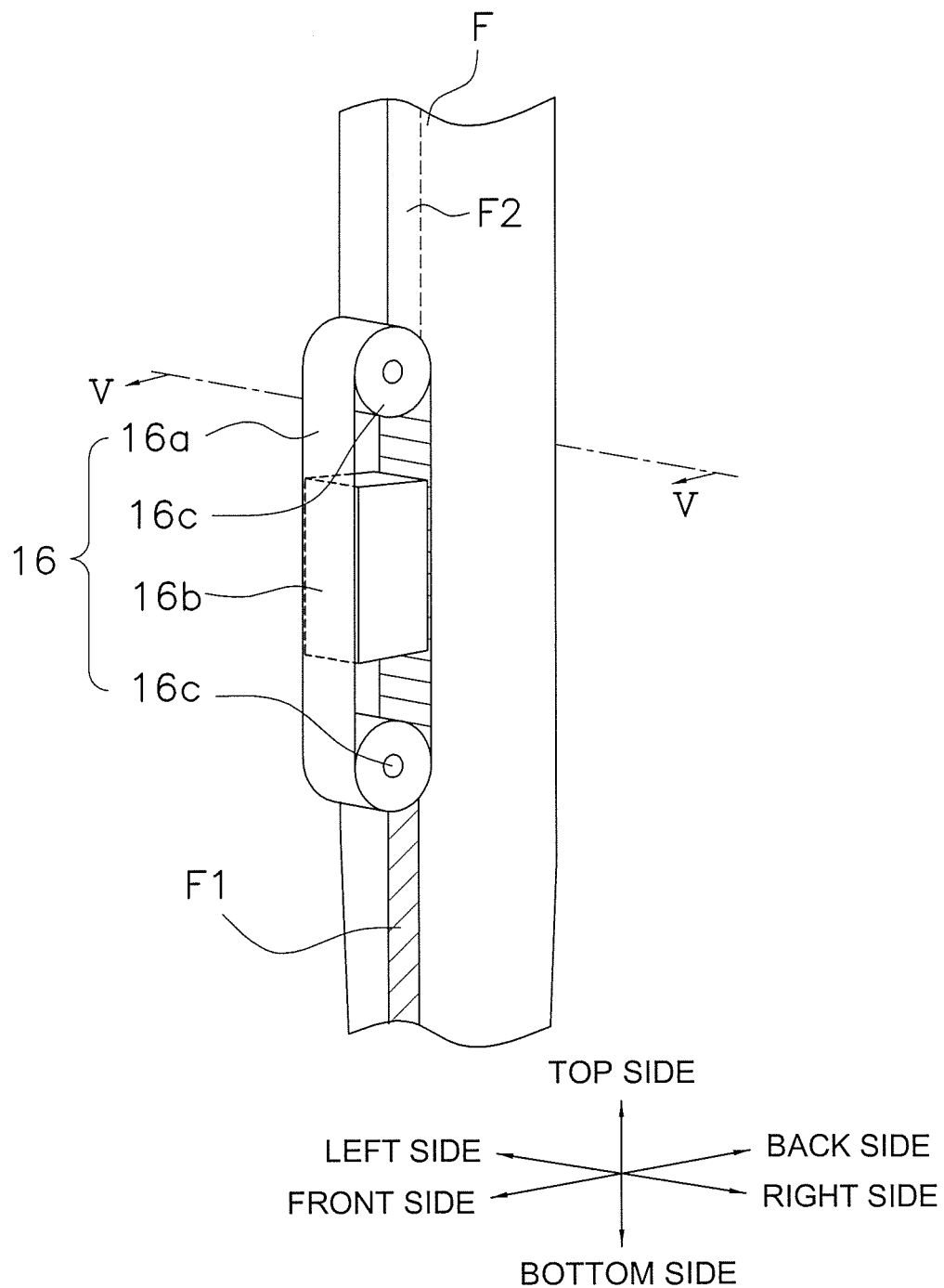
FIG. 4 is an enlarged perspective view schematically showing a vertical sealing mechanism.

FIG. 4 is perspective diagram conceptually showing the vertical sealing mechanism 16. FIG. 5 is a diagram showing a cross section at position V-V shown in FIG. 4.

The vertical sealing mechanism 16 seals the overlapping portion F2 of the rolled film F in its vertical direction with heat. Here, "vertical direction" refers to the direction in which the film F is conveyed.

Specifically, the vertical sealing mechanism 16 includes a heater belt 16a, a heat emitting component 16b and pulleys 16c. The pulleys 16c are disposed one each on the top side and the bottom side. The heater belt 16a is stretched around these pulleys 16c so as to have a predetermined tension. It will be noted that a belt made of metal can be employed for the heater belt 16a and that the thickness thereof is 0.15 mm, for example.

Additionally, when the pulleys 16c rotate, the heater belt 16a also rotates. At this time, the heater belt 16a rotates at substantially the same speed as the conveyance speed of the film F. It will be noted that the pulleys 16c can be caused to rotate by a motor or the like, for example.

The heat emitting body 16b heats the heater belt 16a. Specifically, in FIG. 4, the heat emitting body 16 is disposed on the inner peripheral side of the heater belt 16a. Additionally, the heat emitting body 16b applies heat to the rotating portion of the heater belt 16a on the tube 13b side and heats this portion to 140 to 150° C.

The overlapping portion F2 (FIG. 5) that has been sandwiched between the heater belt 16a and the later-described receiving member 31 is sealed in its vertical direction with heat by the vertical sealing mechanism 16 (seal portion F1).

The vertical sealing mechanism 16 is, for example, controlled by a controller 20 as shown in FIG. 2. For example, the temperature of the heat emitting body 16b and the rotational speed of the heater belt 16a are controlled by the controller 20.

Transverse Sealing Mechanism

FIG. 6 is a diagram conceptually showing the transverse sealing mechanism 17. The transverse sealing mechanism 17 is disposed further on the bottom side than the bottom end of the tube 13b, seals the rolled film F in its transverse direction, and closes the tops and bottoms of the bags B.

Specifically, the transverse sealing mechanism 17 includes a pair of transverse seal units 17a. Each of the pair of transverse seal units 17a includes a seal jaw 51, a coupling portion 17b and a shaft 17c.

The coupling portion 17b couples together the seal jaw 51 and the shaft 17c.

The shaft 17c is capable of self-rotation and is also capable of moving forward and backward. For example, by using a motor for a gyration, the shaft 17c can be caused to self-rotate. Further, by using a motor for moving the shaft, the shaft 17c can be caused to move forward and backward.

The seal jaws 51 belonging to the pair of transverse seal units 17 (called "the pair of seal jaws 51" below) are arranged in front and in back. The pair of seal jaws 51 sandwich the film F, which has been sealed in its vertical direction by the vertical sealing mechanism 16, from its front side and its back side and seal the film F in its transverse direction (position r2). At this time, the seal jaws 51 traverse the cylindrical film F and seal the film F in its transverse direction. Thus, the top sides of the bags B into which the contents C have been packed can be closed. Here, "transverse direction" is the direction facing the left side or the right side.

Sealing of the film F by the pair of seal jaws 51 is performed by applying heat and pressure to the film F. For example, the pressure applied to the film F can be adjusted by the shaft moving-use motor that causes the shafts 17c to move forward and backward.

After the pair of seal jaws 51 sandwich the film F from its front side and its back side, the seal jaws 51 move downward to a predetermined position r1 while sealing the film F (trajectories T1). Thus, the seal jaws 51 can move the film F that has been sealed in its transverse direction downward. Thereafter, the seal jaws 51 release the film F.

Then, the pair of seal jaws 51 move toward mutually opposite sides from the predetermined position r1 to the predetermined position r2 while drawing an arc (trajectories T2). It will be noted that the predetermined position r2 is located further downward than the bottom end of the tube 13b.

The pair of seal jaws 51 that have moved to the predetermined position r1 again sandwich the film F from its front side and its back side and seal the film F along its transverse direction.

It will be noted that movement of the seal jaws 51 along the trajectories T1 is executed as a result of the shafts 17c belonging to the pair of transverse seal units 17a moving toward mutually opposite sides while self-rotating. Movement of the seal jaws 51 along the trajectories T2 is executed by only self-rotation of the shafts 17c.

A cutter is built into one of the pair of seal jaws 51. This cutter cuts the vertical direction center vicinity of the portion that has been sealed in its transverse direction. Thus, the top sides of the bag into which the contents C have been packed can be closed, and the downstream sides of the bag into which the contents C will next be packed can be closed. Thus, it is not necessary to close the downstream sides of the bags again before putting the contents C into the bags.

Receiving Member

The receiving member 31 will be described using FIG. 5. The receiving member 31 is attached to the tube 13b and faces the vertical sealing mechanism 16. Thus, the overlapping portion F2 of the film F is sandwiched between the vertical sealing mechanism 16 and the receiving member 31 (FIG. 5).

Additionally, the overlapping portion F2 is sealed in its vertical direction with heat by the vertical sealing mechanism 16 (seal portion F1).

More specifically, the receiving member 31 faces the portion of the heater belt 16a belonging to the vertical sealing mechanism 16 on the tube 13b side. Additionally, the overlapping portion F2 is sandwiched between the heater belt 16a and the receiving member 31 (FIG. 5).

It will be noted that the shape and the like of the receiving member 31 will be described later.

Buffer Material

The buffer material 4 is disposed on the surface of the receiving member 31 on the vertical sealing mechanism 16 side. The buffer material 4 contacts the overlapping portion F2 between the vertical sealing mechanism 16 and the receiving member 31. It will be noted that the thickness of the buffer material 4 is 3 to 6 mm.

By disposing the buffer material 4 between the receiving member 31 and the film F, the film F that has been sandwiched between the vertical sealing mechanism 16 and the receiving member 31 can be prevented from being damaged.

A material that has elasticity or a material that has heat resistance can be employed for the buffer material 4. According to the buffer material 4 that has elasticity, the film F can be prevented from being damaged. According to the buffer material 4 that has heat resistance, the buffer material 4 can be prevented from being damaged by the heat of the vertical sealing mechanism 16.

A material where friction of its surface on the vertical sealing mechanism 16 side is small may also be employed for the buffer material 4. This buffer material 4 virtually does not hinder the conveyance of the film F. In other words, even when the film F is sandwiched between the vertical sealing mechanism 16 and the receiving member 31, friction that arises between the buffer material 4 and the film F is small, and therefore the film F can be easily conveyed downward.

It will be noted that TEFLON (registered trademark) rubber, silicon rubber, silicon sponge, leather, wood or ultra high molecular weight polyethylene can be employed for the material of the buffer material 4. Of course, the buffer material 4 is not limited to these materials, and various materials can be employed as long as they have elasticity or heat resistance or as long as their friction is small.

Characteristics of Bag-Making and Packaging Machine

The bag-making and packaging machine 1 pertaining to the embodiment of the present invention has characteristics particularly in the receiving member 31. Below, the shape of the receiving member 31 and the attachment of the receiving member 31 to the tube 13b will be described.

Shape of Receiving Member

Figure 8:
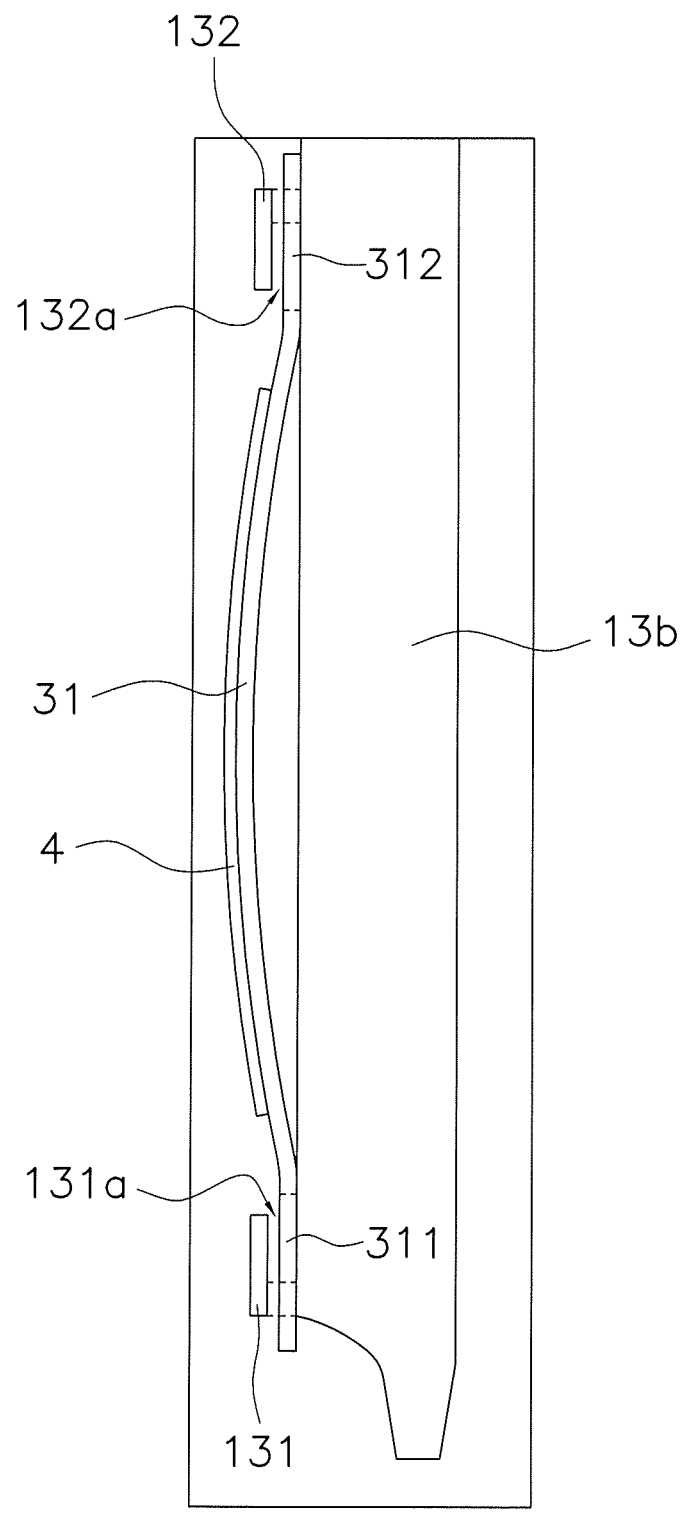
FIG. 8 is an enlarged diagram showing the region VIII shown in FIG. 7.

FIG. 7 is a diagram showing the bag making section 10 as seen from its right side and conceptually showing the shape of the receiving member 31. FIG. 8 is an enlarged diagram showing region VIII shown in FIG. 7 in order to clarify the shape of the receiving member 31.

The receiving member 31 has elasticity and presses, with this elasticity, the overlapping portion F2 of the film F (FIG. 5) toward the vertical sealing mechanism 16.

Specifically, the receiving member 31 curves toward the vertical sealing mechanism 16 and extends up and down. Additionally, the top end and the bottom end of the receiving member 31 are attached to the tube 13b. It will be noted that the thickness of the receiving member 31 is about 0.6 mm.

According to this shape of the receiving member 31, the receiving member 31 gives rise to a repulsive force with respect to the pressure from the vertical sealing mechanism 16 side. In other words, elasticity arises in the receiving member 31.

Figure 9:
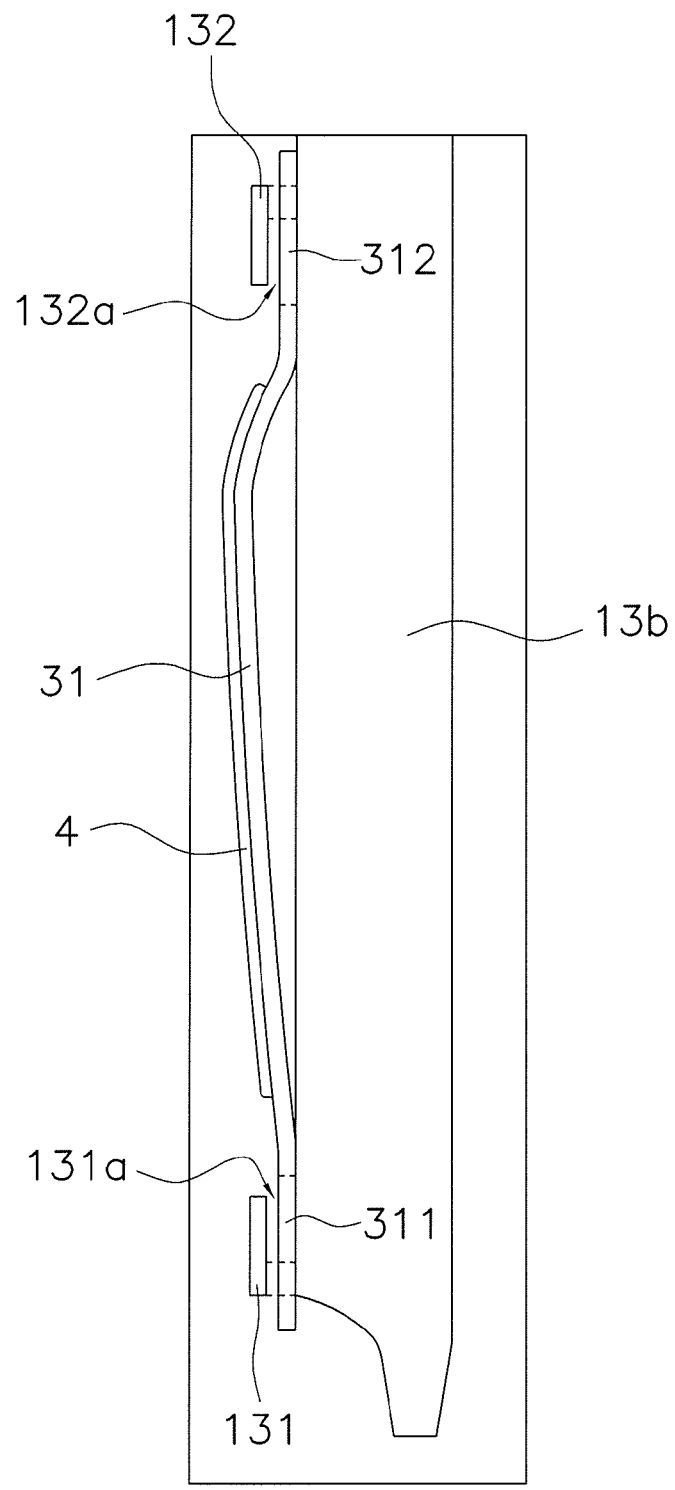
FIG. 9 is a simplified diagram showing another example of the shape of a receiving member.
Figure 10:
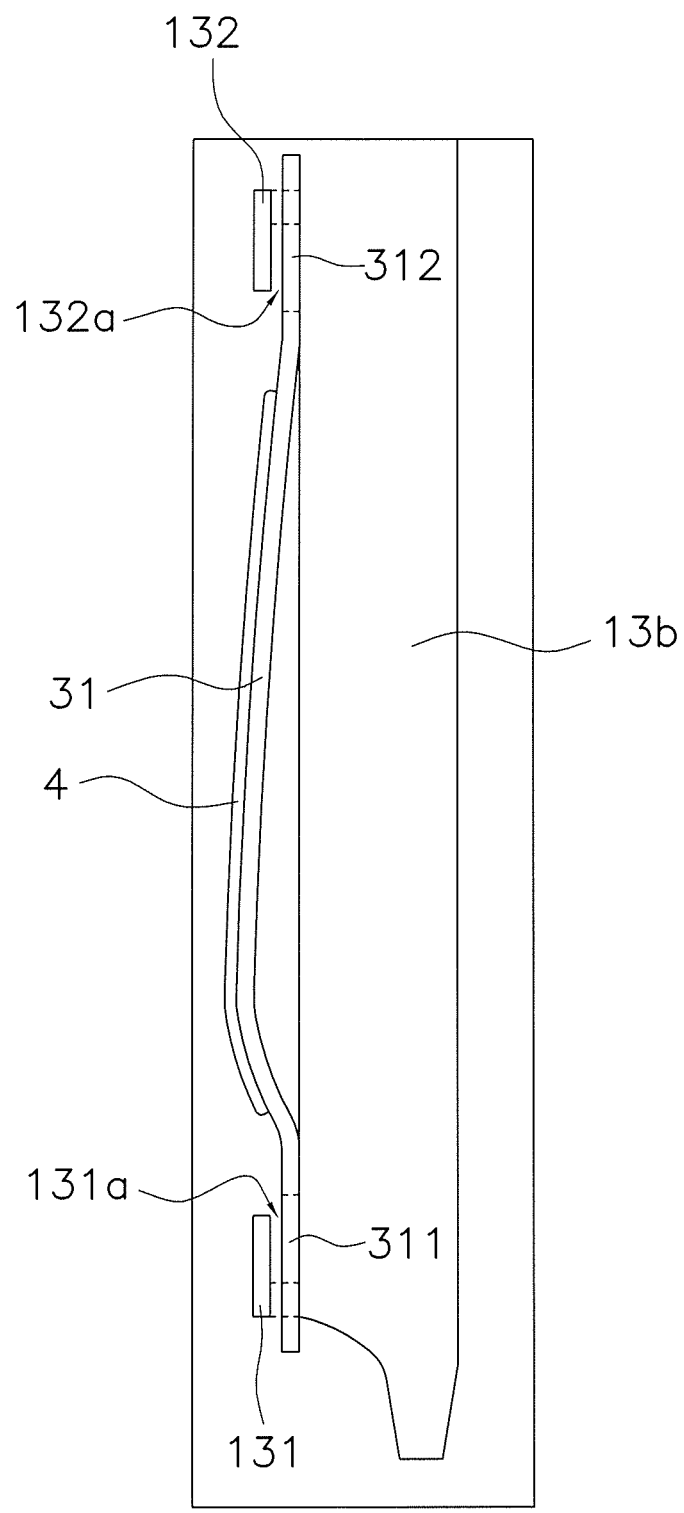
FIG. 10 is a simplified diagram showing yet another example of the shape of the receiving member.

The receiving member 31 may also curve toward the vertical sealing mechanism 16 as shown in FIG. 9 and FIG. 10, for example. That is, in FIG. 8, the center vicinity of the receiving member 31 in the vertical direction comes closest to the vertical sealing mechanism 16, but in FIG. 9, the upper side of the receiving member 31 comes closest to the vertical sealing mechanism 16, and in FIG. 10, the lower side of the receiving member 31 comes closest to the vertical sealing mechanism 16.

According to the aforementioned receiving member 31, the overlapping portion F2 is pressed toward the vertical sealing mechanism 16 by the elasticity of the receiving member 31, so force necessary for sealing can be applied to the overlapping portion F2. Thus, poor sealing of the overlapping portion F2 can be reduced.

It is preferable to employ a member made of metal for the receiving member 31; for example, spring steel can be employed. Thus, the strength of the receiving member 31 can be raised, and therefore the elasticity of the receiving member 31 can be maintained. By employing a stainless spring material (JIS standard/SUS 304 CSP), rusting of the receiving member 31 can also be prevented.

Further, by employing a member that can apply uniform pressure with respect to the vertical sealing mechanism 16 for the receiving member 31, poor sealing can be more efficiently reduced.

In FIG. 5 and FIG. 7 to FIG. 10, the buffer material 4 is attached to the receiving member 31, and shock to the film F resulting from pressing the film F toward the vertical sealing mechanism 16 is absorbed by the buffer material 4.

However, because the receiving member 31 itself has elasticity, shock to the film F can be absorbed even without the buffer material 4.

When the receiving member 31 is a member that also has heat resistance or a member where friction of its surface on the side of the vertical sealing mechanism 16 is small, the receiving member 31 can take on the function of the buffer material 4.

For example, a receiving member 31 that takes on the function of the buffer material 4 can be obtained by using TEFLON (registered trademark) or silicon as the material. However, when food such as confectionery is employed as the contents C, a material that does not go against the Food Sanitation Act must be used for the material of the receiving member 31.

Attachment of Receiving Member to Tube

In all of FIG. 8 to FIG. 10, the receiving member 31 is detachably attached to the tube 13b. In FIG. 8 to FIG. 10, a support member 131 (example of first and second support portions) and a support member 132 (example of a third support portion) are disposed one each on the top and the bottom on the surface on the front side of the tube 13b. The support members 131 and 132 detachably support the top end and the bottom end of the receiving member 31. Moreover, the support member 131 supports the receiving member 31 on the downstream side in the conveyance direction of the film F and deters the receiving member 31 from shifting in the conveyance direction. This will be described specifically below.

FIG. 11 is a diagram showing the bag making section 10 as seen from its bottom side. The support member 131 has a concave shape and, utilizing the portion that is concavely recessed, forms a hole 131a for supporting the receiving member 31 together with the tube 13b. In other words, the hole 131a is surrounded by the support member 131 and the tube 13b.

The support member 132 also has the same shape as that of the support member 131 and forms a hole 132a for supporting the receiving member 31 together with the tube 13b.

Figure 12:
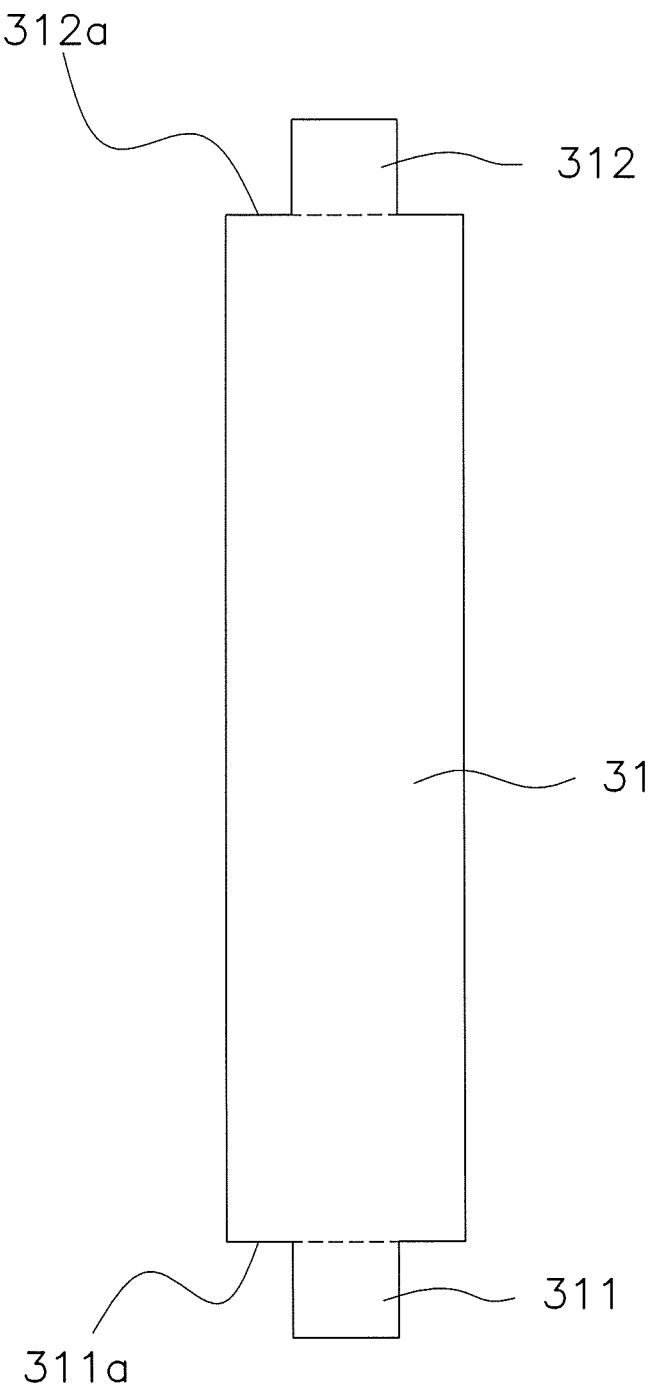
FIG. 12 is a front view showing the receiving member as seen from its front side.

FIG. 12 is a diagram showing the receiving member 31 shown in FIG. 8 to FIG. 10 as seen from its front side. The bottom end of the receiving member 31 has a downwardly convex shape. A portion 311 that projects convexly from the bottom end is inserted into the hole 131a (FIG. 8 to FIG. 10). Additionally, a portion 311a on the shoulder of the convexity on the bottom end catches on the support member 131, whereby the receiving member 31 is prevented from shifting downward (FIG. 11).

Thus, even when force toward the downstream side arises in the receiving member 31 because of friction arising between the receiving member 31 and the film F during conveyance of the film F, the receiving member 31 does not shift downstream (in the conveyance direction).

As mentioned above, when the overlapping portion F2 of the film F is sealed in its vertical direction, the overlapping portion F2 is sandwiched between the receiving member 31 and the heater belt 16a of the vertical sealing mechanism 16. Thus, a force toward the downstream side arises not only in the film F but also in the receiving member 31 as a result of the heater belt 16a rotating.

However, even when this force arises, the receiving member 31 does not shift to the downstream side (in the conveyance direction) because the aforementioned receiving member 31 is supported by the first support member 131.

The portion 311 that has been inserted into the hole 131a is surrounded by the support member 131 and the tube 13b (FIG. 11), so it does not shift from the position of the overlapping portion F2. In other words, the support member 131 supports the receiving member 131 on the downstream side and deters the receiving member 31 from shifting from the position of the overlapping portion F2.

The top end of the receiving member 31 has an upwardly convex shape (FIG. 12). A portion 312 that projects convexly from the top end is inserted into the hole 132a (FIG. 8 to FIG. 10). Additionally, a portion 312a on the shoulder of the convexity on the top end catches on the support member 132. The top end of the receiving member 31 is also supported by the support member 132, so the receiving member 31 can be fixed to the tube 13b.

The portion 312 that has been inserted into the hole 132a is surrounded by the support member 132 and the tube 13b (FIG. 11), so it does not shift from the position of the overlapping portion F2. In other words, the support member 132 supports the receiving member 31 on the downstream side and deters the receiving member 31 from shifting from the position of the overlapping portion F2.

It will be noted that, from just the standpoint of fixing the receiving member 31 to the tube 13b, it is alright even if the top end of the receiving member 31 does not have a convex shape, and it suffices as long as this top end is inserted into the hole 132a.

Because the aforementioned receiving member 31 is attachable to and detachable from the forming mechanism 13, the receiving member 31 can be removed when cleaning the forming mechanism 13 and particularly the tube 13b. Thus, damage to the receiving member 31 caused by such cleaning can be prevented.

Moreover, when the buffer material 4 is attached to the receiving member 31, the phenomenon of peeling of the buffer material 4 from the receiving member 31 can also be prevented.

When the receiving member 31 curves toward the vertical sealing mechanism 16 as mentioned above, detachment of the receiving member 31 from the tube 13b can be performed easily. When the distance from the tube 13b to the portion of the receiving member 31 closest to the vertical sealing mechanism 16 is about 2 mm, detachment is even easier.

It will be noted that, here, a case has been described where each of the support members 131 and 132 takes on both the function (function A) of preventing shifting of the receiving member 31 to the downstream side (in the conveyance direction) and the function (function B) of preventing shifting of the receiving member 31 from the position of the overlapping portion F2, but, for example, support members that are separate in terms of function A and function B may also be disposed on the tube 13b.

The invention claimed is:

1. A bag-making and packaging machine that packages contents while making bags from a sheet-shaped packaging material, the bag-making and packaging machine comprising:
    a forming mechanism configured and arranged to roll the sheet-shaped packaging material into a cylindrical shape to form a cylindrical packaging material;
    a vertical sealing mechanism configured and arranged to seal an overlapping portion of the cylindrical packaging material with heat vertically along a direction in which the cylindrical packaging material extends;
    a transverse sealing mechanism configured and arranged to seal the cylindrical packaging material with heat in a transverse direction of the cylindrical packaging material;
    a receiving member detachably attached to the forming mechanism in a position facing the vertical sealing mechanism, and configured and arranged to sandwich the overlapping portion together with the vertical sealing mechanism, the receiving member having elasticity with which the receiving member presses the overlapping portion toward the vertical sealing mechanism;
    a first support member coupled to the forming mechanism configured and arranged to support a bottom end of the receiving member on a downstream side in a conveyance direction of the packaging material in order to deter the receiving member from shifting downward in the conveyance direction relative to the forming mechanism; and
    an upper support portion coupled to the forming mechanism that supports the receiving member on an upstream side in the conveyance direction of the forming mechanism, wherein
    the receiving member includes a first projection at the bottom end thereof, and a second projection at an upper end thereof, and
    the first support portion includes a first opening with the first projection of the receiving member extending through the first opening and the second projection of receiving member extending through a second opening in the upper support portion.

2. The bag-making and packaging machine of claim 1, wherein the receiving member includes a main section extending between the first projection and the second projection, the main section having a curved shape.

3. The bag-making and packaging machine of claim 2, wherein
the main section of the receiving member having elasticity such that with the receiving member sandwiching the overlapping portion together with the vertical sealing mechanism, the main section of the receiving member undergoes elastic deformation.

* * * * *